Jan. 10, 1950 T. W. SLUTZ 2,494,268
SMOKING PIPE
Filed Oct. 2, 1946

INVENTOR.
THOMAS W. SLUTZ
BY Bates, Teare & McBean
ATTORNEYS

Patented Jan. 10, 1950

2,494,268

UNITED STATES PATENT OFFICE 2,494,268

SMOKING PIPE

Thomas W. Slutz, Cleveland, Ohio, assignor to John M. Powers, Cleveland Heights, Ohio Application October 2, 1946, Serial No. 700,705

3 Claims. (Cl. 131—210)

This invention relates to tobacco pipes and has for its principal object the provision of a pipe that will preclude the accumulation of moisture in the bottom of the bowl or stem adjacent thereto. The invention additionally contemplates a construction that will not only keep the bowl of the pipe dry, but will prevent the bottom of the bowl from burning out.

Figure 1:
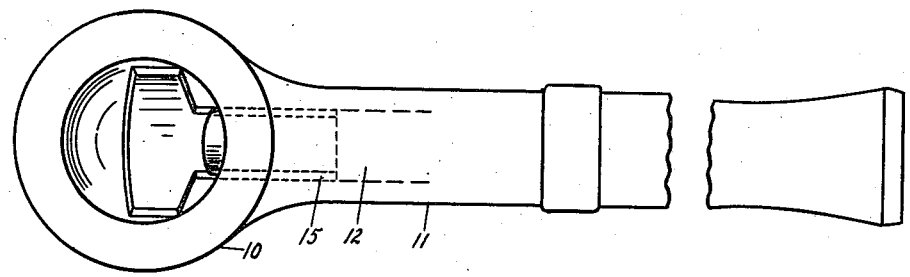
Figure 2:
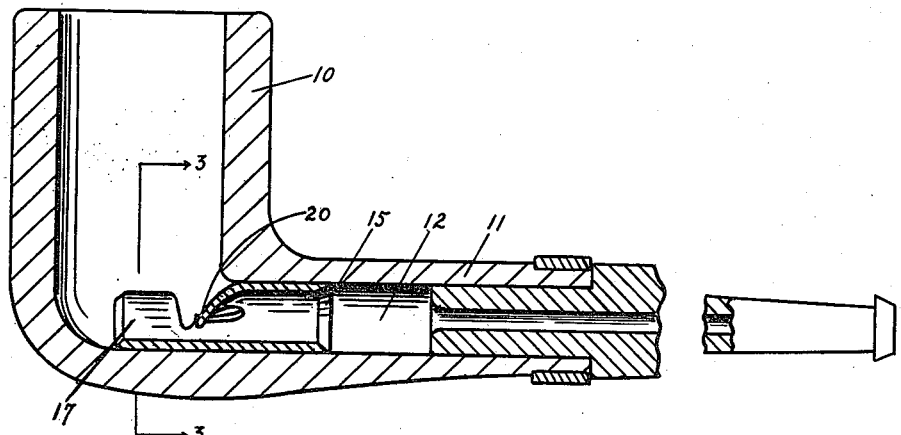
Figure 3:
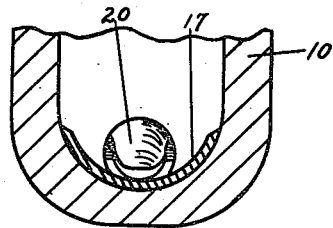
Figure 4:
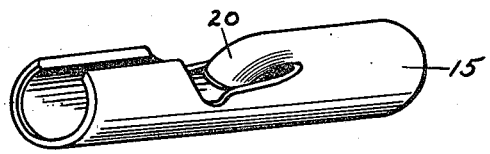
Figure 5:
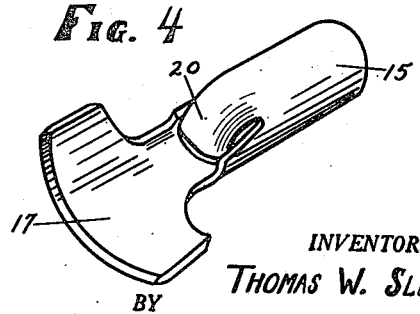

Referring now to the drawings, Fig. 1 is a top plan view of a pipe embodying the present invention; Fig. 2 is a longitudinal peripheral section through the pipe; Fig. 3 is a section taken on the line 3—3 in Fig. 2; Fig. 4 is a perspective view of a tube showing the formation thereof in one stage of the construction, and Fig. 5 is a perspective view of the tube as shown in Fig. 4, illustrating a different stage in the assembly.

Describing the various parts by reference characters, 10 designates the bowl and 11 the stem of a pipe, the stem being provided with a bore 12, the bottom of which is flush with the bottom of the cavity in the bowl. Mounted within the bore of the stem and adjacent the bowl is a tube 15 which has a close fitting engagement with the wall of the bore. In Figs. 1 and 2 the tube is shown as having a portion thereof projecting into the bowl and as having the bowl portion opened outwardly and disposed in close fitting engagement with the bottom of the bowl. Such bowl engaging portion is in the form of a plate 17 that is integral with the tube and that covers substantially the entire exposed bottom portion of the bowl. If desired, the tube may have a lip 20 extending downwardly from the upper portion thereof adjacent the point of communication between the bowl and stem so as to restrict the area of the passageway for smoke flowing from the bowl through the stem. The lip also acts as a baffle to deflect the smoke and any moisture that is contained therein to flow downwardly into contact with the plate, whereupon the heat of the plate evaporates the moisture, thereby keeping the bowl and stem in a dry condition.

I have found that best results are obtained if the tube is made of metal having relatively high heat conducting power, such as aluminum. Aluminum is also satisfactory because it is sufficiently soft and pliable to permit opening of that portion of the tube that is disposed within the confines of the bowl. In practice, the tube is inserted in closed position, as is shown in Fig. 4, into the bowl from the outer end of the stem and is subsequently opened by means of a tool, such as a screw driver, that is inserted downwardly into the bowl, as a result of which the tube assumes the position shown in Fig. 5. The plate is pressed firmly against the bottom of the bowl, whereby the edges of the plate on the end thereof adjacent the stem operate to prevent detachment of the tube, thus holding it permanently in position without the need for extraneous fastening means. The retention is sufficiently tight to permit the introduction of a flexible pipe cleaner through the mouthpiece and into the bottom of the bowl without disturbing the position of the tube with reference to the bowl.

By having the tube extend backwardly into the stem for a considerable distance as is shown in the drawings, there is a sufficient area of contact between the material of which the tube is made and the stem, in the region of the bowl, to effect a transfer of heat to the tube and plate sufficient to vaporize any entrained moisture, as a result of which the pipe remains dry, and the bowl is thereby kept sweet, notwithstanding continued use of the pipe over a long period of time. A further advantage of the plate at the bottom of the bowl is that heat is extracted from the hot gaseous material, thereby resulting in a cool smoke.

I claim:

1. A pipe comprising a bowl and a stem, the stem being provided with a bore extending therethrough and terminating adjacent the bottom of the cavity in the bowl, a plate seated in the bottom of the bowl cavity and having an extension integral therewith and projecting into the bore in close fitting engagement with the wall of the bore, the width of the plate being larger than the diameter of the bore, and means carried by the extension for directing a substantial part of the gas volume onto the plate during the movement thereof from the bowl into the stem.

2. A pipe having a bowl and a stem, a plate seated in the bottom of the cavity in the bowl, the stem having a bore extending therethrough, said plate having a tubular extension integral therewith and projecting into the bore and in close fitting engagement with the wall of the bore and a baffle carried by the extension adjacent the point of communication between the bore and the bowl, said baffle extending downwardly from the top of the extension so as to force a substantial part of the gas volume from the bowl to engage the plate before it flows into the stem.

3. An insert for a pipe comprising a one-piece member having a tubular portion adjacent one end adapted to closely engage the stem of the pipe and having a plate-like portion at the other end, the plate-like portion being normally tubular in shape and adapted for insertion into the bowl through the stem of the pipe and adapted to be opened for engagement with the bottom thereof and said member having a baffle adjacent the region of connection between the tubular and plate-like portion.

THOMAS W. SLUTZ.

REFERENCES CITED

The following references are of record in the file of this patent:

UNITED STATES PATENTS

| Number | Name | Date |
|---|---|---|
| 1,061,009 | Rippel | May 6, 1913 |
| 1,202,944 | Willis | Oct. 31, 1916 |
| 1,291,053 | Madress | Jan. 14, 1919 |
| 2,073,663 | Vogel | Mar. 16, 1937 |

FOREIGN PATENTS

| Number | Country | Date |
|---|---|---|
| 195,230 | Great Britain | Mar. 29, 1923 |